(12) United States Patent
Huang et al.

(10) Patent No.: US 12,271,820 B2
(45) Date of Patent: Apr. 8, 2025

(54) NEURAL NETWORK ACCELERATION AND NEURAL NETWORK ACCELERATION METHOD BASED ON STRUCTURED PRUNING AND LOW-BIT QUANTIZATION

(71) Applicant: ZHEJIANG UNIVERSITY, Zhejiang (CN)

(72) Inventors: Kejie Huang, Zhejiang (CN); Chaoyang Zhu, Zhejiang (CN); Haibin Shen, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 854 days.

(21) Appl. No.: 17/485,645

(22) Filed: Sep. 27, 2021

(65) Prior Publication Data

US 2022/0012593 A1    Jan. 13, 2022

Related U.S. Application Data

(63) Continuation of application No. PCT/CN2020/099891, filed on Jul. 2, 2020.

(30) Foreign Application Priority Data

Jul. 8, 2019 (CN) .......................... 201910609993.5

(51) Int. Cl.
*G06N 3/082* (2023.01)
*G06F 9/50* (2006.01)
*G06N 3/063* (2023.01)

(52) U.S. Cl.
CPC .......... *G06N 3/082* (2013.01); *G06F 9/5027* (2013.01); *G06N 3/063* (2013.01)

(58) Field of Classification Search
CPC ....... G06N 3/082; G06N 3/063; G06F 9/5027
See application file for complete search history.

(56) References Cited

U.S. PATENT DOCUMENTS

| 10,746,792 | B1* | 8/2020 | Diamant ......... G01R 31/31727 |
|---|---|---|---|
| 10,747,502 | B2* | 8/2020 | Pareek ...................... G06F 7/483 |
| 2019/0087708 | A1* | 3/2019 | Goulding ............... G06N 3/082 |
| 2019/0294959 | A1* | 9/2019 | Vantrease .............. G06N 3/063 |
| 2020/0134461 | A1* | 4/2020 | Chai ...................... G06N 3/084 |
| 2020/0293893 | A1* | 9/2020 | Georgiadis ............. G06N 3/082 |
| 2021/0019630 | A1* | 1/2021 | Yao ........................ G06N 3/084 |

* cited by examiner

*Primary Examiner* — Beau D Spratt (57) ABSTRACT

The present invention discloses a neural network accelerator and a neural network acceleration method based on structured pruning and low-bit quantization. The neural network accelerator includes a master controller, an activations selection unit, an extensible calculation array, a multifunctional processing element, a DMA, a DRAM and a buffer. The present invention makes full use of the data reusability during inference operation of a neural network, reduces the power consumption of selecting input activation and weights of effective calculations, and relieves the high transmission bandwidth pressure between the activations selection unit and the extensible calculation array through structured pruning and data sharing on the extensible calculation array, reduces the number of weight parameters and the storage bit width by combining the low-bit quantization technology, and further improves the throughput rate and energy efficiency of the convolutional neural network accelerator.

4 Claims, 5 Drawing Sheets

Convolution kernel 1

Convolution kernel 2

⋮

Convolution kernel F (a)

| Cycle | 0 | 1 | 2 | 3 | 4 | 5 | 6 | 7 | 8 | 9 | 10 | 11 |
|---|---|---|---|---|---|---|---|---|---|---|---|---|
| PE0 | $X_{0,0}$ | $X_{0,1}$ | $X_{0,2}$ | $X_{0,4}$ | $X_{0,5}$ | $X_{0,6}$ | $X_{1,0}$ | $X_{1,1}$ | $X_{1,2}$ | $X_{1,0}$ | $X_{1,1}$ | $X_{1,2}$ |
| PE1 | $X_{0,1}$ | $X_{0,2}$ | $X_{0,3}$ | $X_{0,5}$ | $X_{0,6}$ | $X_{0,7}$ | $X_{1,1}$ | $X_{1,2}$ | $X_{1,3}$ | $X_{1,1}$ | $X_{1,2}$ | $X_{1,3}$ |
| PE2 | $X_{0,2}$ | $X_{0,3}$ | $X_{0,4}$ | $X_{0,6}$ | $X_{0,7}$ | $X_{0,8}$ | $X_{1,2}$ | $X_{1,3}$ | $X_{1,4}$ | $X_{1,2}$ | $X_{1,3}$ | $X_{1,4}$ |
| PE3 | $X_{0,3}$ | $X_{0,4}$ | $X_{0,5}$ | $X_{0,7}$ | $X_{0,8}$ | $X_{0,9}$ | $X_{1,3}$ | $X_{1,4}$ | $X_{1,5}$ | $X_{1,3}$ | $X_{1,4}$ | $X_{1,5}$ |
| Weight | $W_{0,0}$ | $W_{0,1}$ | $W_{0,2}$ | $W_{0,0}$ | $W_{0,1}$ | $W_{0,2}$ | $W_{0,0}$ | $W_{0,1}$ | $W_{0,2}$ | $W_{0,3}$ | $W_{0,4}$ | $W_{0,5}$ |

(a)

| Cycle | Skip 0 | 0 | 1 | Skip 3 | 2 | 3 | Skip 6 | 4 | 5 | Skip 9 | 6 | Skip 11 |
|---|---|---|---|---|---|---|---|---|---|---|---|---|
| PE0 | $X_{0,0}$ | $X_{0,1}$ | $X_{0,2}$ | $X_{0,4}$ | $X_{0,5}$ | $X_{0,6}$ | $X_{1,0}$ | $X_{1,1}$ | $X_{1,2}$ | $X_{1,0}$ | $X_{1,1}$ | $X_{1,2}$ |
| PE1 | $X_{0,1}$ | $X_{0,2}$ | $X_{0,3}$ | $X_{0,5}$ | $X_{0,6}$ | $X_{0,7}$ | $X_{1,1}$ | $X_{1,2}$ | $X_{1,3}$ | $X_{1,1}$ | $X_{1,2}$ | $X_{1,3}$ |
| PE2 | $X_{0,2}$ | $X_{0,3}$ | $X_{0,4}$ | $X_{0,6}$ | $X_{0,7}$ | $X_{0,8}$ | $X_{1,2}$ | $X_{1,3}$ | $X_{1,4}$ | $X_{1,2}$ | $X_{1,3}$ | $X_{1,4}$ |
| PE3 | $X_{0,3}$ | $X_{0,4}$ | $X_{0,5}$ | $X_{0,7}$ | $X_{0,8}$ | $X_{0,9}$ | $X_{1,3}$ | $X_{1,4}$ | $X_{1,5}$ | $X_{1,3}$ | $X_{1,4}$ | $X_{1,5}$ |
| Weight | 0 | $W_{0,1}$ | $W_{0,2}$ | 0 | $W_{0,1}$ | $W_{0,2}$ | 0 | $W_{0,1}$ | $W_{0,2}$ | 0 | $W_{0,4}$ | 0 |

NEURAL NETWORK ACCELERATION AND NEURAL NETWORK ACCELERATION METHOD BASED ON STRUCTURED PRUNING AND LOW-BIT QUANTIZATION

CROSS-REFERENCE TO RELATED APPLICATIONS

This application is a continuation of International Application No. PCT/CN2020/099891, filed on Jul. 2, 2020, which claims the benefit of priority from Chinese Patent Application No. 201910609993.5, filed on Jul. 8, 2019. The content of the aforementioned applications, including any intervening amendments thereto, are incorporated herein by reference.

TECHNICAL FIELD

The present invention relates to the technical field of design of sparse convolutional neural network accelerators, in particular to a neural network accelerator and a neural network acceleration method based on structured pruning and low-bit quantization.

BACKGROUND OF THE PRESENT INVENTION

Convolutional neural networks rapidly play an important role in many applications such as computer vision, robot control, video analysis, speech recognition, natural language processing, targeted advertising recommendation and network search. The convolutional neural networks can provide excellent effects, but have a large number of operation parameters and high calculation complexity. Due to the limitation of performance and power consumption of traditional processors, large-scale convolutional neural networks are hardly implemented in embedded or terminal devices. Therefore, on the premise of ensuring the prediction accuracy of convolutional neural networks, the compression of network models and the design of special hardware accelerators are research hotspots at present.

Methods for compressing the network models include pruning, quantization and block loop representation. After pruning, the neural networks become sparse; convolution kernels are compressed and stored; and the weights pruned in different convolution kernels may be different, thereby causing irregularity of the inference operation of the networks. The architecture of an accelerator based on a sparse neural network needs to overcome the irregularity to further improve the performance and energy efficiency of the accelerator by pruning. At present, the irregularity is mainly overcome by two methods as follows: a first method includes the steps of performing Cartesian product operation on an input activations vector and a weight vector, calculating the coordinates of output activation in an output feature map, and then using the calculated coordinates for controlling a matrix switch to store the results of Cartesian product operation in the corresponding position. A second method includes the steps of reading compressed weights first, then restoring the positions of the compressed weight values in an original weight matrix, performing logical "and" operations on the input activation vector and weight vector, and selecting out the input activation and the weights of effective calculations for operation. The effective calculations are valid only when the input activation and the weights are nonzero values. The effective calculation refers to a process of multiplying the input activations and the weight value when the input activation and the weights are nonzero values. The first method has problems that the additional calculation of the coordinates of the output activation is required, thereby increasing the calculation power consumption. Meanwhile, the Cartesian product operation performed on a convolutional layer will cause that the outputs have hash conflict, while the Cartesian product operation performed on a fully connected layer will cause that only part of outputs are effective. The second method has problems that each input activations needs to be multiplied by the weights in different three-dimensional (3D) convolution kernels in convolution operation, so the input activation and the different 3D convolution kernels shall be selected, which will cause high power consumption; and high fan-out outputted by a selecting unit will increase the difficulty of wiring designing and timing optimization. The two methods have negative effects on the improvement of performance and energy efficiency by convolutional neural network accelerators through pruning.

SUMMARY OF THE PRESENT INVENTION

In view of this, the purpose of the present invention is to provide a neural network accelerator and a neural network acceleration method based on structured pruning and low-bit quantization, for improving the acceleration effect of the accelerator and reducing the power consumption of the accelerator.

To achieve the above purpose, the present invention provides a neural network accelerator based on structured pruning and low-bit quantization. The neural network accelerator includes:

a master controller, an activations selection unit, an extensible calculation array, a multifunctional processing element, a DMA (Direct Memory Access), a DRAM (Dynamic Random Access Memory) and a buffer, wherein the master controller is respectively connected with the activations selection unit, the extensible calculation array and the DMA; the DMA is respectively connected with the buffer and the DRAM; the buffer is respectively connected with the multifunctional processing element and the activations selection unit; and the extensible calculation array is respectively connected with the activations selection unit and the buffer.

The master controller is used for parsing an instruction set to generate a first storage address of input activation and weights, a storage address of output activation and control signals.

The buffer is used for storing the input activation, the output activation and weight indexes.

The activations selection unit is used for selecting the input activation inputted from the buffer according to the control signals generated by the master controller and transmitting the input activation to the extensible calculation array.

The extensible calculation array includes N×M processing elements (PEs), wherein N and M represent the number of rows and columns of the PEs respectively. Each PE stores part of weights of the neural network, determines a second storage address of the weights according to the received weight indexes, acquires the weights corresponding to the input activation through the activations selection unit according to the second storage address of the weights, and controls the reading of the weights and the on-off state of a multiplier in the PE by judging whether the received input activation is zero. Each PE judges whether the currently calculated output activations completes the convolution of the input activations and the weight of an input channel according to the control signals generated by the master controller, and if so, the PE stores the output activations into an output activations buffer in the buffer through the activations selection unit.

The multifunctional processing element is used for completing pooling, activation and normalization operations of the network.

The DMA is used for reading the weights stored in the DRAM according to the first storage address of the weights, reading the output activation stored in the buffer according to the storage address of the current output activations, and transmitting the output activation to the DRAM for storage.

Optionally, the master controller includes:
an instruction set decoder, an address generator, a control vector generator and seven counters. The instruction set decoder is respectively connected with an input end of each counter; an output end of each counter is respectively connected with the address generator and the control vector generator; the address generator is connected with the DMA; the control vector generator is respectively connected with the activations selection unit and the extensible calculation array; the seven counters are cascaded in sequence; and an overflow signal of the previous stage is taken as an increased signal of the next stage.

The instruction set decoder is used for decoding the instruction set, generating an upper judgment limit and a lower judgment limit of each counter, and controlling the seven counters to cyclically count and output {kw, kh, ow, oh, ic, oc, 1} according to the upper judgment limit and the lower judgment limit.

The address generator is used for generating the first storage address of the input activation and the weights required for calculation in the next clock cycle and the storage address of the current output activations according to {kw, kh, ow, oh, ic, oc, 1} outputted by the seven counters, and transmitting the obtained addresses to the DMA.

The control vector generator is used for generating a control signal (ctrl) according to {kw, kh, ow, oh, ic, oc, 1} outputted by the seven counters, and then controlling the activations selection unit and the extensible calculation array according to the control signal (ctrl).

Optionally, the activations selection unit includes:
an input activations register, an index decoder and a selector, and the selector is respectively connected with the input activations register and the index decoder.

The input activations register is used for reading in and outputting the input activation according to the control signals generated by the master controller.

The index decoder is used for decoding weight indexes to generate jump value.

The selector is used for selecting the input activation according to the jump value and transmitting the input activation to the extensible calculation array.

Optionally, the buffer includes:
an input activations buffer, an output activations buffer and a weight index buffer. The weight index buffer and the input activations buffer are respectively connected with the DMA; and the weight index buffer and the input activations buffer are respectively connected with the activations selection unit. The output activations buffer is respectively connected with the DMA, the multifunctional processing element and the extensible calculation array.

The input activations buffer is used for storing the input activation.

The output activations buffer is used for storing the output activation.

The weight index buffer is used for storing the weight indexes.

The present invention also provides a neural network acceleration method based on structured pruning and low-bit quantization, including:

S01: performing structured pruning and low-bit quantization on a neural network to obtain a compressed model and an index set representing positions of the compressed weights;

S02: analyzing the compressed model to obtain parameters and operand bit width of each layer of the network, and determining the size of an extensible calculation array in combination with the given hardware resources;

S03: calling a master controller with an IP (Intellectual Property) core, an activations selection unit and PEs to form a neural network accelerator according to the size of the extensible calculation array;

S04: reading in original input activation, the compressed model, the index set and the instruction set, and turning on the neural network accelerator, wherein the instruction set is used for completing the mapping relationship between the compressed network and the hardware resources by combining the parameters of each layer of the network and the size of the extensible calculation array.

Optionally, the step of performing structured pruning on the neural network specifically includes:
the weights of different 3D convolution kernels at the same position in a convolution layer are pruned simultaneously, so that different convolution kernels have the same index; an input feature map and a convolution kernel index are selected by the activations selection unit to obtain input activation and weight indexes of all effective calculations; and some rows of the weight matrices in a fully connected layer are pruned.

Optionally, the mapping relationship between the compressed network and the hardware resources specifically includes:
for an extensible calculation array including N×M PEs, every row of PEs in the extensible calculation array share the same weight, and every column of PEs share the same input activations in the calculation of the convolution layer, so the whole extensible calculation array shares N input activation and a weight index. In the calculation of the fully connected layer, each row of the extensible calculation array shares the same input activations, and the weights of the PEs are different, but the structured pruning makes the same column of PEs have the same weight index, so the extensible calculation array shares N input activation and N weight indexes.

Optionally, a specific formula of the low-bit quantization is as follows:

$$\begin{cases} w^T x \cong \sum_{i=1}^{n} x_i \times 2^{w_i'} = \sum_{i=1}^{n} \text{Bitshift}(x_i, w_i') \\ w_i' = \text{Quantize}[\log_2^{w_i}] \end{cases}$$

In the formula, w represents the weight vector; x represents the input activations; $x_i$ represents an ith input activations; $w_i$ represents an ith weight in the weight vector; $w_i'$ represents the value of quantized $w_i$; n represents the total number of partial sums to be accumulated; the function Bitshift(a, b) means to move a by b bits, and a moving direction is determined by the notation of b; and the function Quantize[y] is used for rounding y.

According to the specific embodiments provided by the present invention, the present invention achieves the following technical effects:

The present invention makes full use of the data reusability during inference operation of the neural network, reduces the power consumption of selecting the input activation and the weights of effective calculations, and relieves the high transmission bandwidth pressure between the activations selection unit and the extensible calculation array through structured pruning and data sharing on the extensible calculation array, reduces the number of weight parameters and the storage bit width by combining the low-bit quantization technology, and further improves the throughput rate and energy efficiency of the convolutional neural network accelerator.

BRIEF DESCRIPTION OF THE DRAWINGS

To more clearly describe the technical solutions in the embodiments of the present invention or in prior art, the drawings required to be used in the embodiments will be simply presented below. Apparently, the drawings in the following description are merely some embodiments of the present invention, and for those skilled in the art, other drawings can also be obtained according to these drawings without contributing creative labor.

DETAILED DESCRIPTION OF THE PRESENT INVENTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

The purpose of the present invention is to provide a neural network accelerator and a neural network acceleration method based on structured pruning and low-bit quantization, for improving the acceleration effect of the accelerator and reducing the power consumption of the accelerator.

To make the above purpose, features and advantages of the present invention more apparent and understandable, the present invention will be further described in detail in combination the accompanying drawings and specific embodiments.

Figure 1:
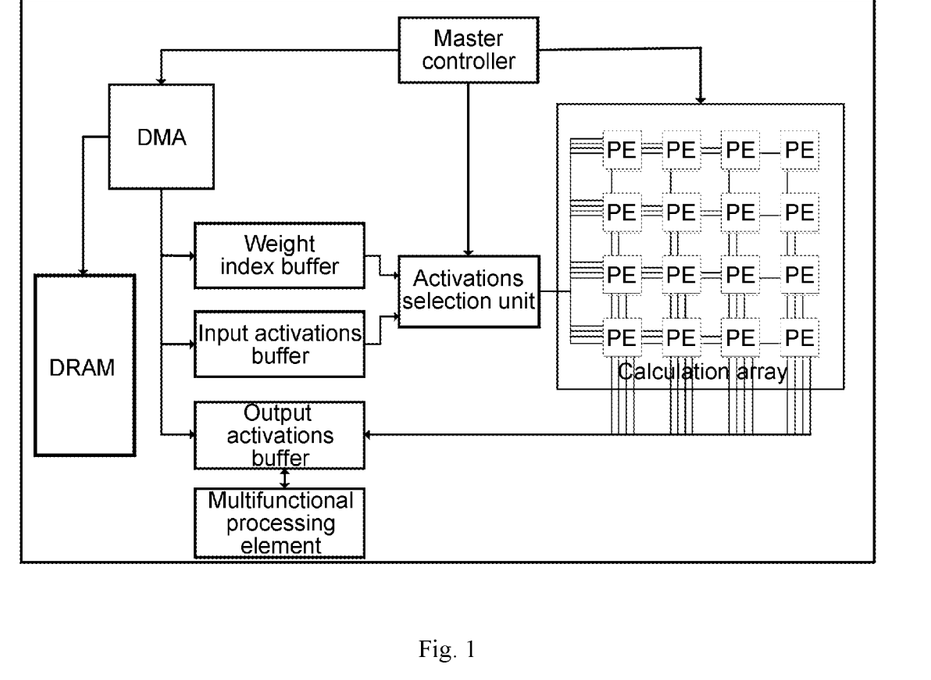
FIG. 1 is a top-level architecture diagram of a neural network accelerator according to an embodiment of the present invention.

As shown in FIG. 1, the present invention discloses a neural network accelerator based on structured pruning and low-bit quantization. The neural network accelerator includes:

a master controller, an activations selection unit, an extensible calculation array, a multifunctional processing element, a DMA, a DRAM and a buffer. The master controller is respectively connected with the activations selection unit, the extensible calculation array and the DMA; the DMA is respectively connected with the buffer and DRAM; the buffer is respectively connected with the multifunctional processing element and the activations selection unit; and the extensible calculation array is respectively connected with the activations selection unit and the buffer.

The master controller is used for parsing an instruction set to generate a first storage address of input activation and weights, a storage address of output activation and control signals.

The buffer is used for storing the input activation, the output activation and weight indexes.

The activations selection unit is used for selecting the input activation inputted from the buffer according to the control signals generated by the master controller and transmitting the input activation to the extensible calculation array.

The extensible calculation array includes N×M PEs; and N and M represent the number of rows and columns of the PEs respectively. Each PE stores part of weights of the neural network, determines a second storage address of the weights according to the received weight indexes, acquires the weights corresponding to the input activation through the activations selection unit according to the second storage address of the weights, and controls the reading of the weights and the on-off state of multiplier in the PE by judging whether the received input activation is zero. Each PE judges whether the currently calculated output activations completes the convolution of the input activations and the weight of an input channel according to the control signals generated by the master controller; and if so, the PE stores the output activations into an output activations buffer in the buffer through the activations selection unit.

The multifunctional processing element is used for completing pooling, activation and normalization operations of the network.

The DMA is used for reading the weights stored in the DRAM according to the first storage address of the weights, reading the output activation stored in the buffer according to the storage address of the current output activations, and transmitting the output activation to the DRAM for storage.

Figure 2:
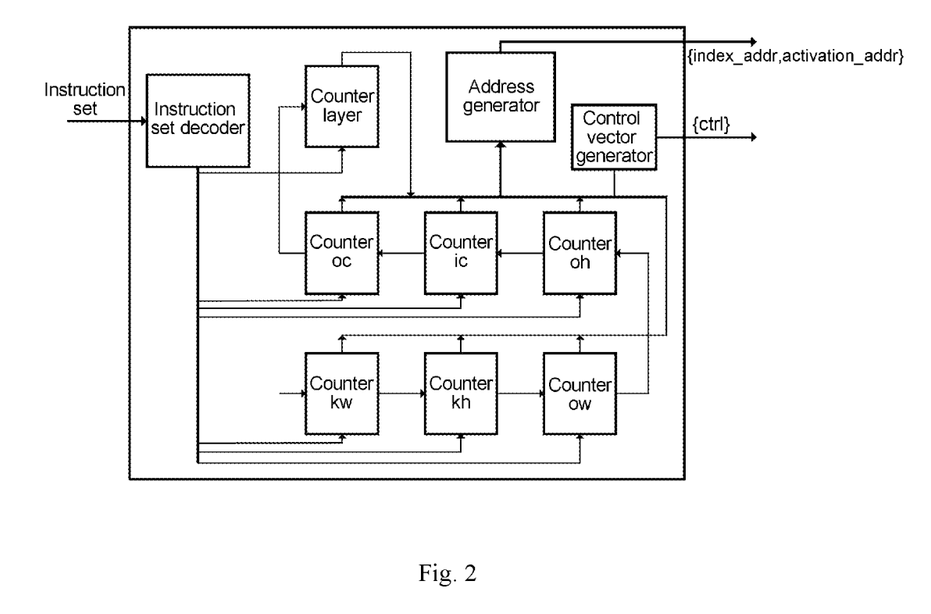
FIG. 2 is a structural diagram of a master controller according to an embodiment of the present invention.

As shown in FIG. 2, the master controller includes an instruction set decoder, an address generator, a control vector generator and seven counters. The instruction set decoder is respectively connected with an input end of each counter; an output end of each counter is respectively connected with the address generator and the control vector generator; the address generator is connected with the DMA; and the control vector generator is respectively connected with the activations selection unit and the extensible calculation array. The seven counters are cascaded in sequence; an overflow signal (overflow) of the previous stage is taken as an increased signal (inc) of the next stage; the seven counters sequentially output {kw, kh, ow, oh, ic, oc, l}, which represents acceleration process, wherein kw represents the column number of the currently calculated weights; kh represents the row number of the currently calculated weights; ow represents the column number of the currently calculated output activation; oh represents the row number of the currently calculated output activation; ic represents the channel number of the currently calculated input activation; oc represents the channel number of the currently calculated output activation; and l represents the batch number of the currently calculated input activation. The instruction set decoder is used for decoding the instruction set, generating an upper judgment limit and a lower judgment limit of each counter, and controlling the seven counters to cyclically count and output {kw, kh, ow, oh, ic, oc, l} according to the upper judgment limit and the lower judgment limit. The address generator is used for generating the first storage address of the input activation and the weights required for calculation in the next clock cycle and the storage address of the current output activations according to {kw, kh, ow, oh, ic, oc, l} outputted by the seven counters, and transmitting the obtained addresses to the DMA. The control vector generator is used for generating a control signal (ctrl) according to {kw, kh, ow, oh, ic, oc, l} outputted by the seven counters, and then controlling the activations selection unit and the extensible calculation array according to the control signal (ctrl).

Figure 3:
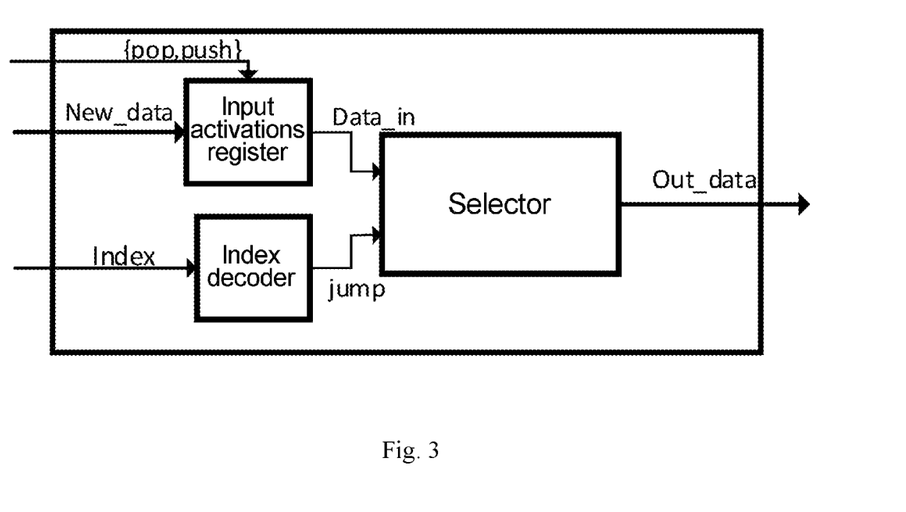
FIG. 3 is a structural diagram of an activations selection unit according to an embodiment of the present invention.

As shown in FIG. 3, the activations selection unit includes an input activations register, an index decoder and a selector. The selector is respectively connected with the input activations register and the index decoder. The input activations register is used for reading in and outputting the input activation according to the control signals generated by the master controller. The index decoder is used for decoding weight indexes to generate jump value (jump). The selector is used for screening the input activation according to a jump value (jump) signal, specifically skipping the calculation process corresponding to zero weights according to the index set, and selecting the input activation and weight indexes corresponding to nonzero weights to be transmitted to the extensible calculation array.

The extensible calculation array includes N×M PEs; N and M represent the number of rows and columns of the PEs respectively; the PEs can be classified into N groups; each group of PEs calculate different output channels in parallel; and M PEs in each group calculate different output activation in the same output channel in parallel.

The extensible calculation array includes the following calculation processes: storing part of weights of the neural network by each PE, and determining a second storage address of the weights according to the received weights, wherein the read address is an address of the weights in an on-chip buffer; acquiring the weights corresponding to the input activation according to the second storage address of the weights, and judging whether the received input activation are zero so as to control the reading of the weights and the on-off state of a multiplier in the PE; specifically, if the input activation are nonzero, reading the corresponding weights, enabling the multiplier to multiply the input activation and the weights to obtain a partial sum; if the input activation are zero, no longer reading the corresponding weights to reduce the power consumption of memory access, and turning off the multiplier to reduce the power consumption of calculation, i.e., the partial sum is 0; then, accumulating the partial sum with the previous partial sum to obtain a new partial sum, i.e., the current output activations; judging whether the current output activations completes the convolution of the input activation and the weights of one input channel according to the control signal generated by the master controller; if so, storing the output activations into an output activations buffer in the buffer through the activations selection unit; and if not, storing the output activations in each PE.

The multifunctional processing element is used for completing pooling, activation and normalization operations of the network. In FIG. 1, the output activation generated by the extensible calculation array are stored in the output activations buffer first, and then are subjected to the pooling, activation and normalization operations of the network; and the final output activation are returned to the output activations buffer after the operations are completed.

The DRAM is used for storing the weights and the output activation. Because the neural network has a huge number of parameters, for large networks such as VGG-16, it is difficult to store the weights completely in the buffer even after model compression. Meanwhile, part of layers of the network have huge output feature maps, so that the DRAM is also needed.

The buffer includes an input activations buffer, an output activations buffer and an index buffer. The weight index buffer and the input activations buffer are respectively connected with the DMA; and the weight index buffer and the input activations buffer are respectively connected with the activations selection unit. The output activations buffer is respectively connected with the DMA, the multifunctional processing element and the extensible calculation array. The input activations buffer is used for storing the input activation. The output activations buffer is used for storing the output activation. The weight index buffer is used for storing the weight indexes. The network conducts calculation in blocks; and the data stored in the buffer should be reused to reduce the repeated reading of the DRAM and reduce the power consumption of reading.

Figure 4:
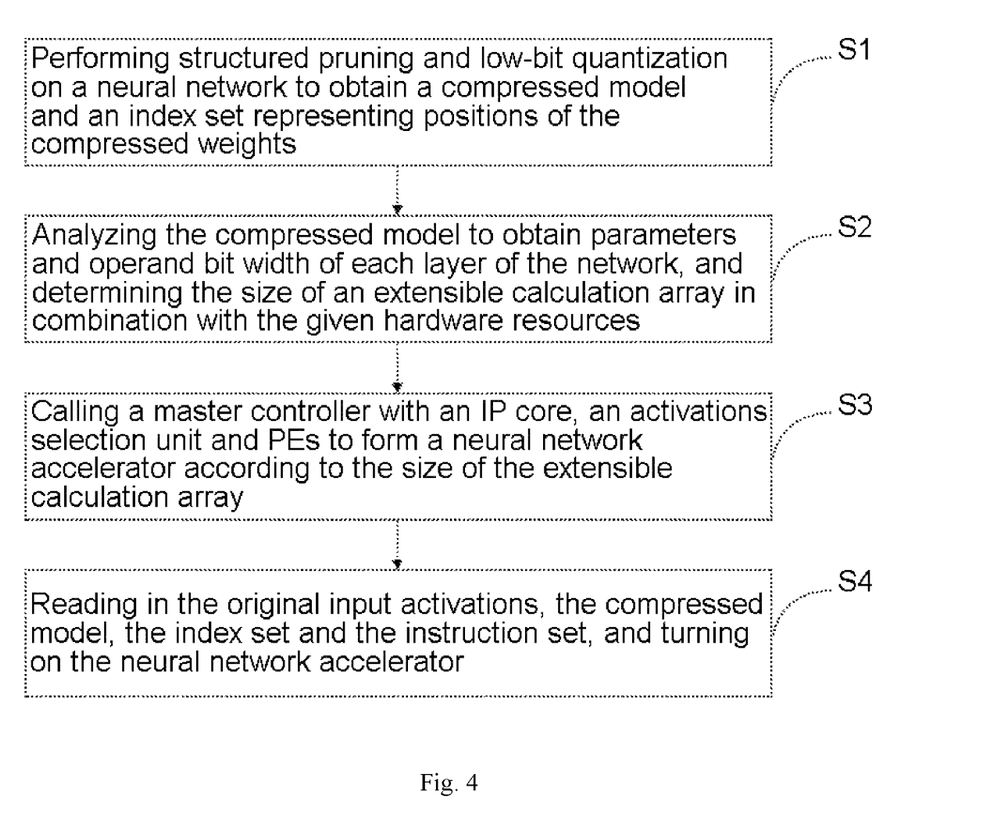
FIG. 4 is a work flow chart of an accelerator according to an embodiment of the present invention.

FIG. 4 is a work flow chart of the accelerator according to an embodiment of the present invention. As shown in FIG. 4, the present invention discloses a neural network acceleration method based on structured pruning and low-bit quantization, including:

S01: performing structured pruning and low-bit quantization on a neural network to obtain a compressed model and an index set representing positions of the compressed weights;

S02: analyzing the compressed model to obtain parameters and operand bit width of each layer of the network, and determining the size of an extensible calculation array in combination with the given hardware resources, wherein the parameters of each layer of the network include bit width, weight and activations; and the hardware resources include the size of on-chip memory and the number of DSPs (Digital Signal Processors);

S03: invoking a master controller with an IP core, an activations selection unit and PEs to form a neural network accelerator according to the size of the extensible calculation array;

S04: reading in original input activation, the compressed model, the index set and the instruction set, and turning on the neural network accelerator, wherein the instruction set is used for completing the mapping relationship between the compressed network and the hardware resources by combining the parameters of each layer of the network and the size of the extensible calculation array.

Figure 5:
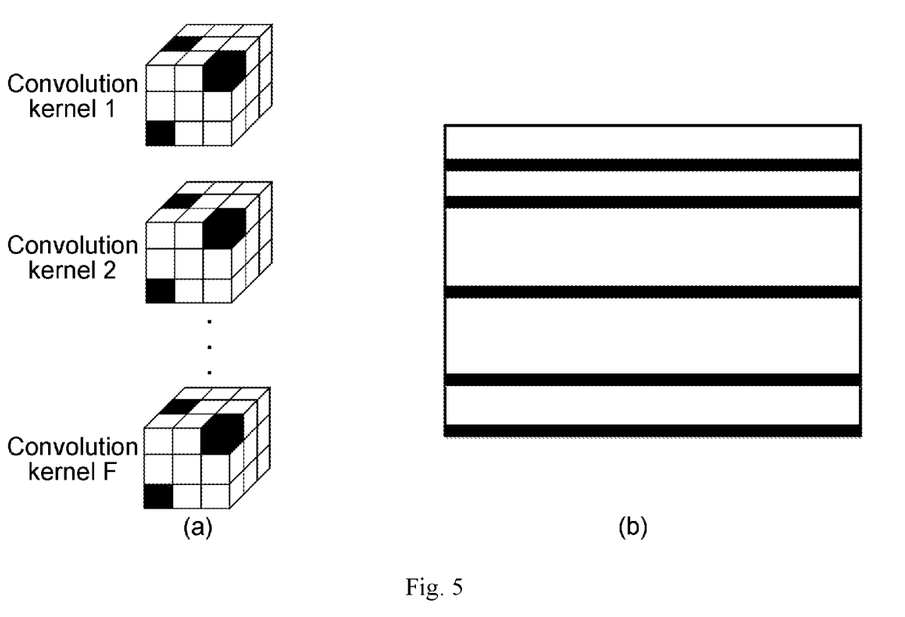
FIG. 5 is a schematic diagram of structured pruning according to an embodiment of the present invention.

FIG. 5 is a schematic diagram of structured pruning according to an embodiment of the present invention. FIG. 5(a) is a schematic diagram of structured pruning of convolution kernels; and FIG. 5(b) is a schematic diagram of structured pruning of weight matrix. As shown in FIG. 5, the step of performing structured pruning on the neural network specifically includes:

the weights of different 3D convolution kernels are simultaneously pruned at the same position in a convolution layer so that different convolution kernels have the same index; an input feature map and a convolution kernel index are selected by the activations selection unit to obtain input activation and weight indexes of all effective calculations; and some rows of the weight matrices in a fully connected layer are pruned, wherein the corresponding column elements of row vectors of the input activation do not need to be calculated and therefore are not stored.

Further, the mapping relationship between the compressed network and the hardware resources specifically includes:

for an extensible calculation array including N×M PEs, every row of PEs in the extensible calculation array share the same weight, and every column of PEs share the same input activations in the calculation of the convolution layer, so the whole extensible calculation array shares N input activations and a weight index. In the calculation of the fully connected layer, each row of the extensible calculation array shares the same input activations, and the weights of the PEs are different, but the structured pruning makes the same column of PEs have the same weight index, so the extensible calculation array shares N input activation and N weight indexes.

Further, a specific formula of the low-bit quantization is as follows:

$$\begin{cases} w^T x \cong \sum_{i=1}^{n} x_i \times 2^{w'_i} = \sum_{i=1}^{n} \text{Bitshift}(x_i, w'_i) \\ w'_i = \text{Quantize}[\log_2^{w_i}] \end{cases}.$$

In the formula, w represents the weight vector; x represents the input activations; $x_i$ represents an ith input activations; $w_i$ represents an ith weight in the weight vector; $w_i'$ represents the value of quantized $w_i$; n represents the total number of partial sums to be accumulated; the function Bitshift(a, b) means to move a by b bits, and a moving direction is determined by the notation of b; and the function Quantize[y] is used for rounding y. When b>0, Bitshift(a, b) means to move a to the left by b bits; otherwise, Bitshift(a, b) means to move a to the right by b bits. When $w'_i \geq \sqrt{2}-1$, y is rounded up; otherwise, y is rounded down. In addition, different networks have different requirements for the quantization bit width. When the product of the input activation and the weights is calculated, the multiplication operation can be realized by shift operation. After quantization, the power consumption of operation is greatly reduced.

Figure 6:
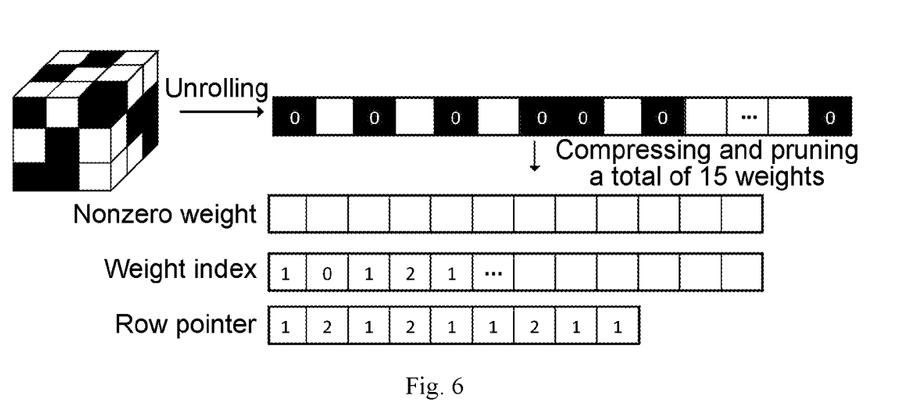
FIG. 6 is a diagram of compressed weights and indexes according to an embodiment of the present invention.

In the present embodiment, the structured pruning is performed on the neural network; the weights of the pruned sparse network are compressed by rows and then stored; and indexes and row pointers of positions of the weights should be stored and recorded. As shown in FIG. 6, the indexes indicate the number of "0" between two nonzero weights; the index of a first nonzero weight in each row is equal to the number of "0" ahead of the nonzero weight in the row; and the row pointer represents the total number of nonzero weights in each row.

In the present embodiment, the convolution layer is calculated in blocks; and the loop of convolution operation is unrolled to make full use of the parallelism of the extensible calculation array and improve the reusability of data. Pseudocodes for the block calculation and loop unrolling of the convolution layer are as follows:

```
Nonzero_weight array[ ];#Store nonzero weights only, and compress by row
Index_array[ ];# Store indexes
Row_point[ ];# Store the number of nonzero weights in each row
Offset_array[ ];# Store the number of nonzero weights of each channel
kw_count = 0;# Row pointer
kh = 0;# Row number of the convolution kernel
kw = 0;# Column number of the convolution kernel
jump = 0;
    for(oc = 0; oc < F; oc = oc + N){
        for(ic = 0; ic < C; ic + +){
            i = i + Offse_array[ic];
            for(oh = 0; oh < U; oh + +){
                for(ow = 0; ow < V; ow = ow +M ){
                    if(kh = = R && kw = kw_max)
                        i = i - Offset_array[ic];
                    for(kh = 0; kh < R; kh + +){
                        kw count = ic * R + kh;
                        kw max = Row_point[kw count] ;
                        i = i + kw_max;
                        jump = 0;
                        for(kw = 0; kw < kw_max; kw + + ){
                            jump = jump + Index_array[i + kw];
###Loop Unroll
                            for(Toc = oc; Toc < oc + N; Toc + +){
                                for(Tow = ow; Tow < ow + M; Tow + +){
                                    Y_{Tow,oh}^{Toc} = W_{kw,kh}^{Toc,ic} + X_{tow+kw+jump,oh+kh}^{ic}
###Loop Unroll
}}}}}}}}
```

In the pseudocodes, H represents the height of an input feature map; W represents the width of the input feature map; C represents the channel number of the input feature map; R represents the height and width of weights; F represents the channel number of an output feature map; U represents the height of the output feature map; V represents the width of the output feature map; kw represents the column number of the currently calculated weights; kh represents the row number of the currently calculated weights; ow represents the column number of the currently calculated output activations; oh represents the row number of the currently calculated output activations; is represents the channel number of the currently calculated input activations; oc represents the channel number of the currently calculated output activations; l represents the batch number of the currently calculated input activations; Toc represents the channel number of the output feature map; Tow represents the column number of the output feature map; Y represents the output activations; W represents the weight; and X represents the input activations.

In the present embodiment, loop unrolling is used to enable the extensible calculation array to simultaneously calculate M output activation of N channels of the output feature map, i.e., different rows of the extensible calculation array calculate different channels of the output feature map, and different PEs in the same row calculate different output activation of a certain channel of the output feature map. Therefore, each row of the extensible calculation array shares the same weight; and each column shares the same input activations. Meanwhile, the weights inputted to different rows come from the same position of different 3D convolution kernels. After structured pruning, different 3D convolution kernels in the same layer have the same index, so the whole extensible calculation array shares the same weight index.

In the present embodiment, a process of convolving an input feature map X(H, W, C) with a four-dimensional (4D) convolution kernel W(R, R, C, F) to obtain an output feature map (U, V, F) is mapped to an N×M extensible calculation array, and the mapping relationship is as follows:

$$\begin{cases} oc_{max} = \lceil F/N \rceil \\ ow_{max} = \lceil V/M \rceil \end{cases}.$$

In the formula, F represents the channel number of the output feature map; N represents the total number of channels for simultaneous calculation of the output feature map; V represents the width of the output feature map; M represents the total number of output activation for simultaneous calculation of the output feature map; $oc_{max}$ represents the maximum channel number of the currently calculated output activations; and $ow_{max}$ represents the maximum column number of the currently calculated output activations.

Figure 7:
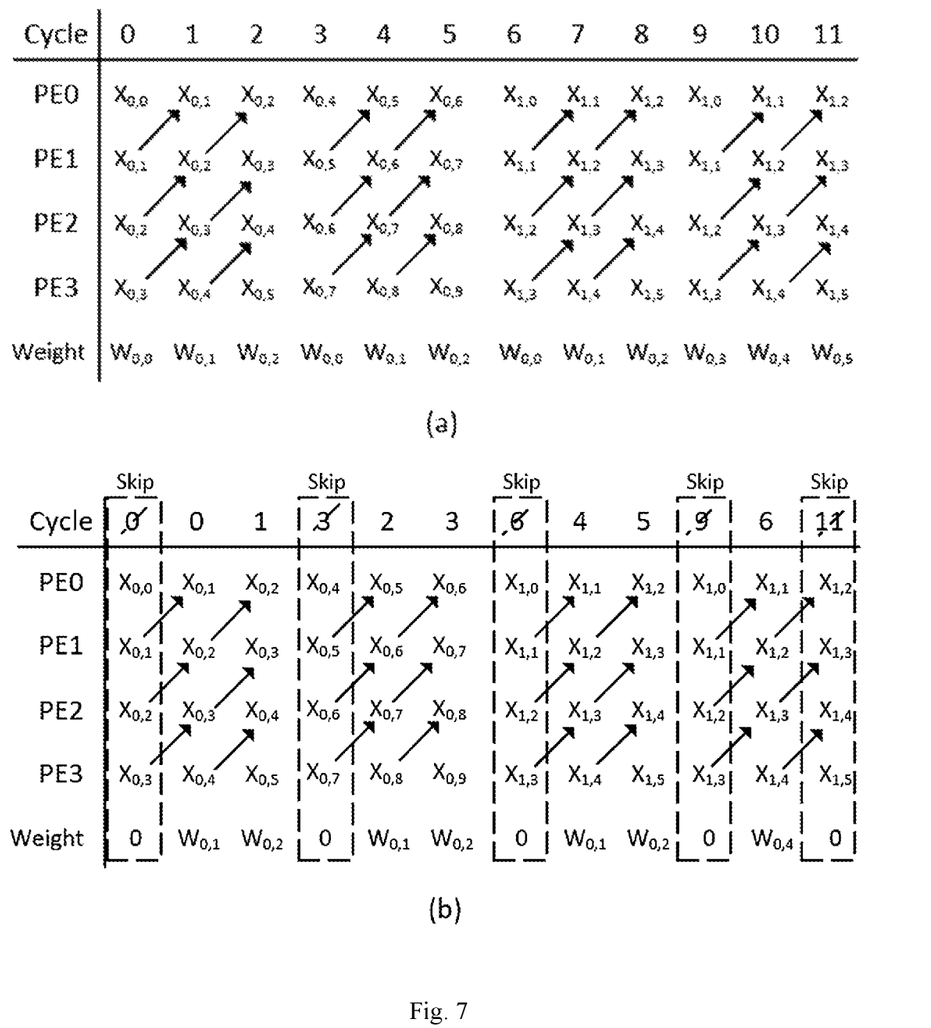
FIG. 7 is a diagram of a convolution operation mode according to an embodiment of the present invention.

In the present embodiment, the mapping from the convolution to each row of the extensible calculation array is the same. FIG. 7 describes an operation mode of the convolution process between the input feature map X(10, 10, 1) and the 4D convolution kernel W(3, 3, 1, 16) in a certain row of the extensible calculation array; and it is assumed that each row of the extensible calculation array has only four PEs. FIG. 7(a) shows a convolution operation mode of the network without structured pruning. Because V=8, $ow_{max}$=2, i.e., each PE needs to calculate two output activation. FIG. 7(b) shows a convolution operation mode of the network based on structured pruning. Compared with FIG. 7(a), whether the weight is zero is judged according to the index in FIG. 7(b); if the weight is zero, the corresponding calculation can be skipped, and the judgment process is implemented in the activations selection unit.

Figure 8:
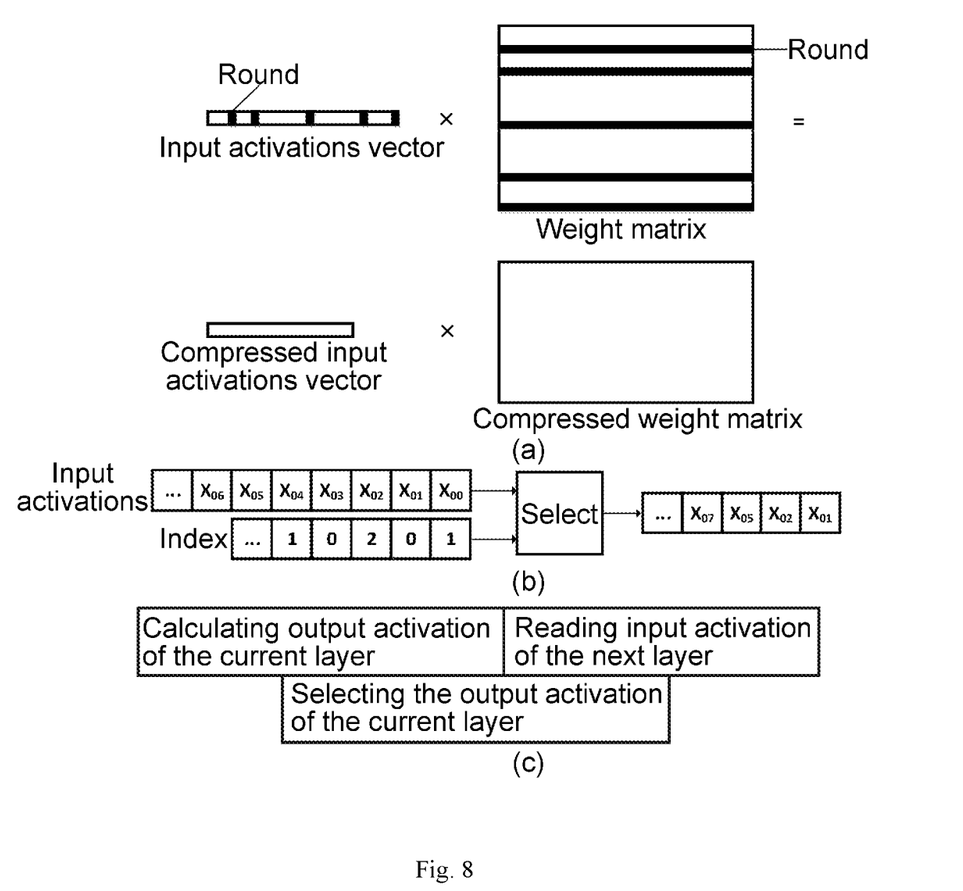
FIG. 8 is a diagram of an operation mode of a fully connected layer according to an embodiment of the present invention.

In the present embodiment, the operation of the fully connected layer is as shown in FIG. 8, and some rows of the weight matrices are pruned, so the corresponding column elements of the input activations vector are not involved in the calculation. In the present embodiment, when the next layer of the current layer is a fully connected layer, the output activation of the current layer is selected by the weight indexes of the next layer, as shown in FIG. 8(b); and a pipeline is constructed to hide the selecting process between the calculation of the output activation of the current layer and the reading of the input activation of the next layer, as shown in FIG. 8(c).

In the present embodiment, the activations selection unit is used for selecting the input activation. When the convolution layer is calculated, the activations selection unit reads the weight index jump according to control information of the master controller; the input activations vector Data_in contains 2 M input activation; and the selector selects Data_in>>jump to skip the calculation when the weight is 0. When the last weight of each row is calculated, the master controller sends a push signal to the activations selection unit and stores the new input activation in the activations register. When one row of weights is calculated, the master controller sends a pop signal to the activations selection unit and outputs a new input activations vector Data_in. When the fully connected layer is calculated, the selector reads in the output activation of the current layer and the indexes of the next layer, and selects out the output activation corresponding to the nonzero weights.

What is claimed is:

1. A neural network accelerator based on structured pruning and low-bit quantization, comprising:
a master controller;
an activations selection unit;
an extensible calculation array;
a multifunctional processing element;
a Direct Memory Access (DMA);
a Dynamic Random Access Memory (DRAM); and
a buffer,
wherein the master controller is respectively connected with the activations selection unit, the extensible calculation array and the DMA; the DMA is respectively connected with the buffer and the DRAM; the buffer is respectively connected with the multifunctional processing element and the activations selection unit; and the extensible calculation array is respectively connected with the activations selection unit and the buffer;
the master controller is configured for parsing an instruction set to generate a first storage address of input activation and weights, a storage address of output activation and control signals;
the buffer is configured for storing the input activation, the output activation and weight indexes;
the activations selection unit is configured for selecting the input activation inputted from the buffer according to the control signals generated by the master controller and transmitting the input activation to the extensible calculation array;
the extensible calculation array comprises N×M processing elements (PEs); N and M represent rows and columns of the PEs respectively; each PE is configured to store part of weights of the neural network, determine a second storage address of the weights according to the received weight indexes, acquire the weights corresponding to the input activation according to the second storage address of the weights, and control the reading of the weights and the on-off state of a multiplier in the PE by judging whether the received input activation are zero; each PE is configured to judge whether the currently calculated output activations completes the convolution of the input activations and the weight of an input channel according to the control signals generated by the master controller, and if so, the PE stores the output activations into an output activations buffer in the buffer through the activations selection unit;
the multifunctional processing element is configured for completing pooling, activation and normalization operations of the network; and
the DMA is configured for reading the weights stored in the DRAM according to the first storage address of the weights, reading the output activation stored in the buffer according to the storage address of the current output activations, and transmitting the output activation to the DRAM for storage;
wherein the master controller comprises:
an instruction set decoder;
an address generator;
a control vector generator; and
seven counters;
wherein the instruction set decoder is respectively connected with an input end of each counter; an output end of each counter is respectively connected with the address generator and the control vector generator; the address generator is connected with the DMA; the control vector generator is respectively connected with the activations selection unit and the extensible calculation array; the seven counters are cascaded in sequence; and an overflow signal of the previous stage is taken as an increased signal of the next stage;

the instruction set decoder is configured for decoding the instruction set, generating an upper judgment limit and a lower judgment limit of each counter, and controlling the seven counters to cyclically count and output {kw, kh, ow, oh, ic, oc, l} according to the upper judgment limit and the lower judgment limit;

the address generator is configured for generating the first storage address of the input activation and the weights required for calculation in the next clock cycle and the storage address of the current output activations according to {kw, kh, ow, oh, ic, oc, l} outputted by the seven counters, and transmitting the obtained addresses to the DMA; and the control vector generator is configured for generating a control signal (ctrl) according to {kw, kh, ow, oh, ic, oc, l} outputted by the seven counters, and then controlling the activations selection unit and the extensible calculation array according to the control signal (ctrl).

2. A neural network accelerator based on structured pruning and low-bit quantization, comprising:

a master controller;
an activations selection unit;
an extensible calculation array;
a multifunctional processing element;
a Direct Memory Access (DMA);
a Dynamic Random Access Memory (DRAM); and
a buffer, wherein the master controller is respectively connected with the activations selection unit, the extensible calculation array and the DMA; the DMA is respectively connected with the buffer and the DRAM; the buffer is respectively connected with the multifunctional processing element and the activations selection unit; and the extensible calculation array is respectively connected with the activations selection unit and the buffer;

the master controller is configured for parsing an instruction set to generate a first storage address of input activation and weights, a storage address of output activation and control signals;

the buffer is configured for storing the input activation, the output activation and weight indexes;

the activations selection unit is configured for selecting the input activation inputted from the buffer according to the control signals generated by the master controller and transmitting the input activation to the extensible calculation array;

the extensible calculation array comprises N×M PEs; N and M represent rows and columns of the PEs respectively; each PE is configured to store part of weights of the neural network, determine a second storage address of the weights according to the received weight indexes, acquire the weights corresponding to the input activation according to the second storage address of the weights, and control the reading of the weights and the on-off state of a multiplier in the PE by judging whether the received input activation are zero; each PE is configured to judge whether the currently calculated output activations completes the convolution of the input activations and the weight of an input channel according to the control signals generated by the master controller, and if so, the PE stores the output activations into an output activations buffer in the buffer through the activations selection unit;

the multifunctional processing element is configured for completing pooling, activation and normalization operations of the network; and the DMA is configured for reading the weights stored in the DRAM according to the first storage address of the weights, reading the output activation stored in the buffer according to the storage address of the current output activations, and transmitting the output activation to the DRAM for storage;

wherein the activations selection unit comprises:
an input activations register;
an index decoder; and
a selector, wherein the selector is respectively connected with the input activations register and the index decoder;

the input activations register is configured for reading in and outputting the input activation according to the control signals generated by the master controller;

the index decoder is configured for decoding weight indexes to generate jump value; and the selector is configured for selecting the input activation according to the jump value and transmitting the input activation to the extensible calculation array.

3. The neural network accelerator based on structured pruning and low-bit quantization according to claim 2, wherein the buffer comprises:

an input activations buffer;
the output activations buffer; and
a weight index buffer;

wherein the weight index buffer and the input activations buffer are respectively connected with the DMA; the weight index buffer and the input activations buffer are respectively connected with the activations selection unit;

and the output activations buffer is respectively connected with the DMA, the multifunctional processing element and the extensible calculation array;

the input activations buffer is configured for storing the input activation;

the output activations buffer is configured for storing the output activation; and the weight index buffer is configured for storing the weight indexes.

4. A neural network acceleration method based on structured pruning and low-bit quantization, the method comprising:

a) performing structured pruning and low-bit quantization on a neural network to obtain a compressed model and an index set representing positions of the compressed weights;

b) analyzing the compressed model to obtain parameters and operand bit width of each layer of the network, and determining the size of an extensible calculation array in combination with the given hardware resources;

c) calling a master controller with an Intellectual Property (IP) core, an activations selection unit and PEs to form a neural network accelerator according to the size of the extensible calculation array; and d) reading in original input activation, the compressed model, the index set and an instruction set, and turning on the neural network accelerator, wherein the instruction set is configured for completing a mapping relationship between the compressed network and the hardware resources by combining the parameters of each layer of the network and the size of the extensible calculation array;

wherein the step of performing structured pruning on the neural network comprises:

the weights of different 3D convolution kernels at the same position in a convolution layer are pruned simultaneously, so that different convolution kernels have the same index; an input feature map and a convolution kernel index are selected by the activations selection unit to obtain input activation and weight indexes of all effective calculations; and some rows of weight matrices in a fully connected layer are pruned.

* * * * *